April 13, 1937.   F. B. DOOLITTLE   2,077,357
INSULATION TESTING APPARATUS
Filed Dec. 24, 1934   2 Sheets-Sheet 1
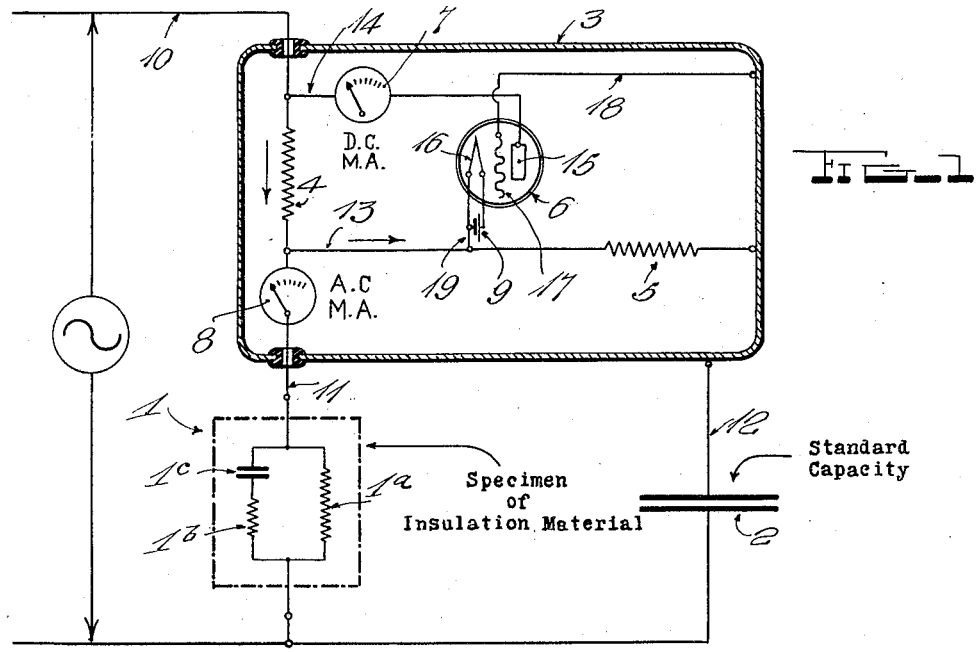
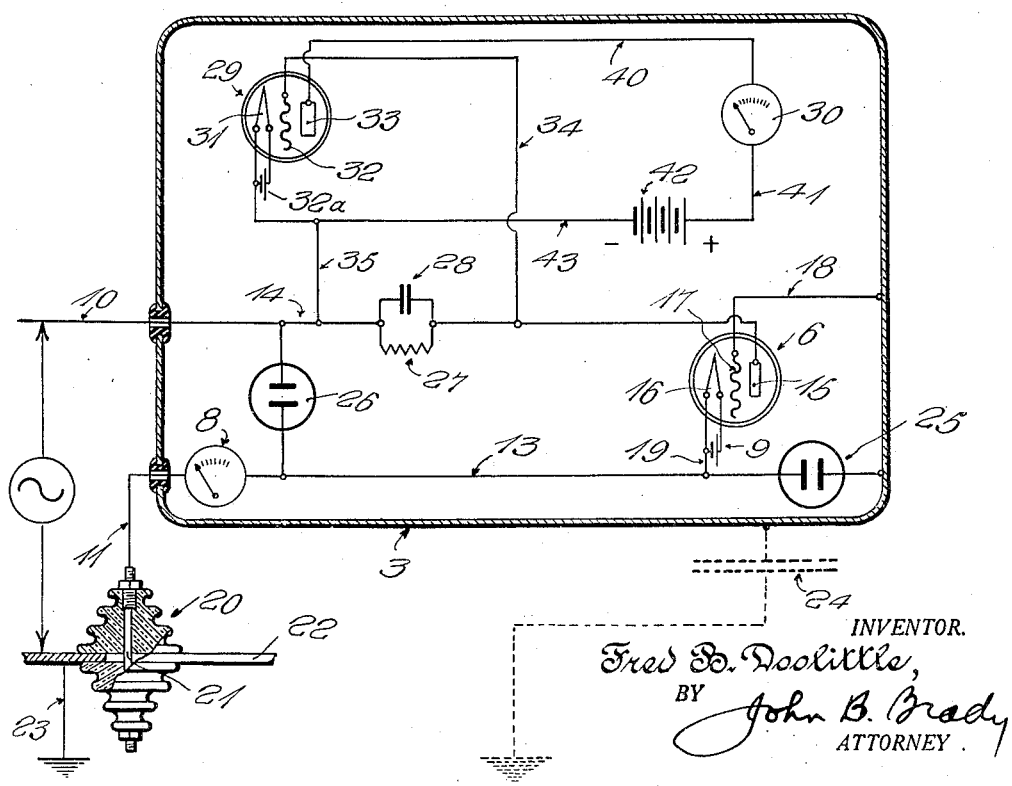
INVENTOR.
Fred B. Doolittle,
BY John B. Brady
ATTORNEY.

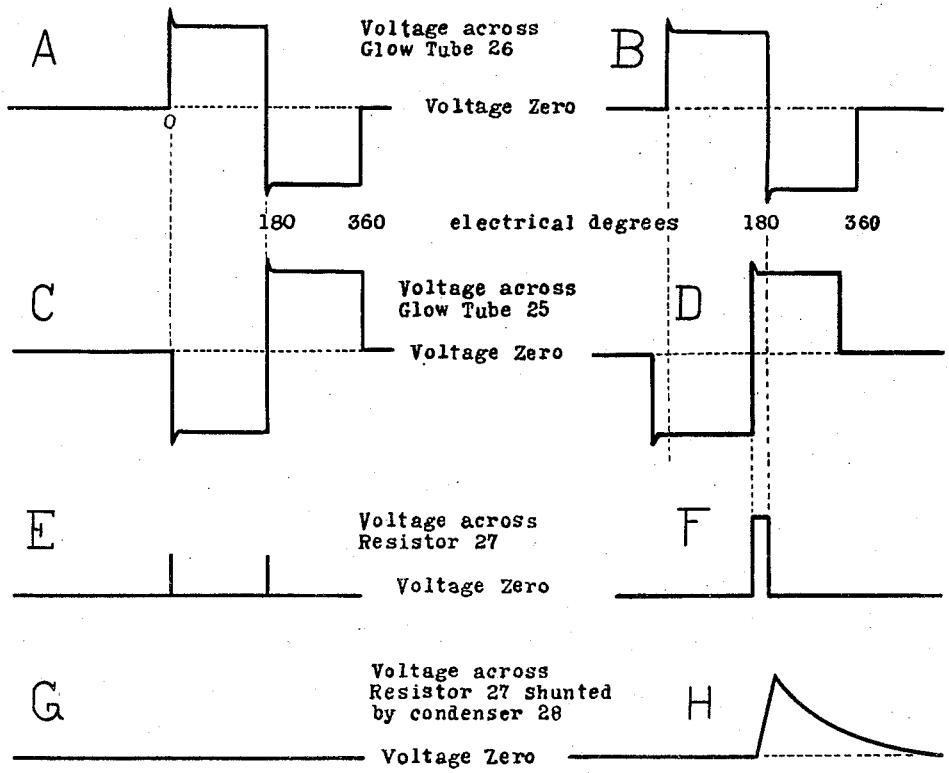
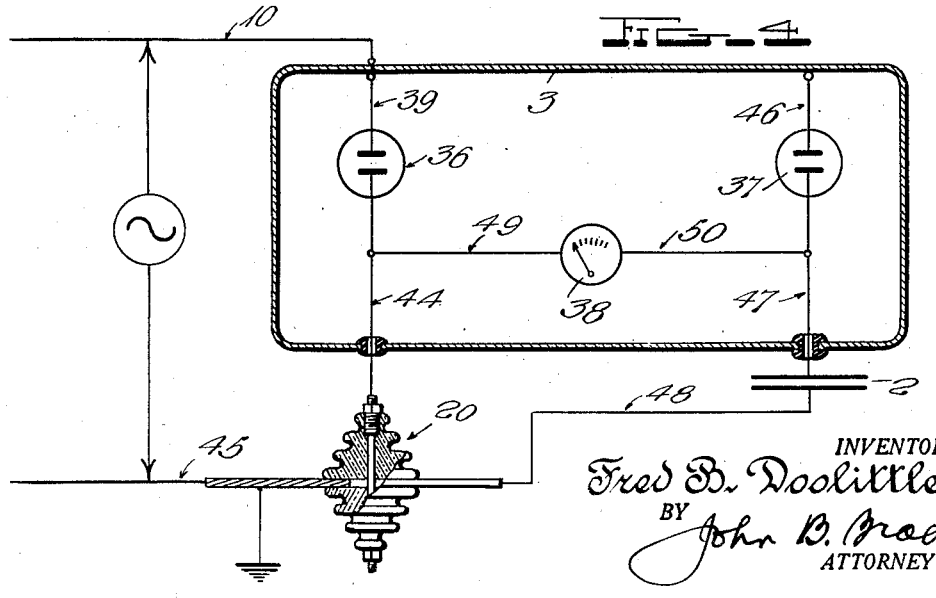

Patented Apr. 13, 1937

2,077,357

UNITED STATES PATENT OFFICE 2,077,357

INSULATION TESTING APPARATUS

Fred B. Doolittle, Glendale, Calif.

Application December 24, 1934, Serial No. 759,114

19 Claims. (Cl. 175—183)

My invention relates broadly to electrical testing apparatus and more particularly to an apparatus for testing insulation material.

One of the objects of my invention is to provide a compact and simplified construction of insulation testing apparatus which is light in weight and is readily portable for testing the dielectric properties of insulation.

Another object of my invention is to provide a simplified construction of apparatus which is adapted for use in the field for testing the dielectric properties of high potential insulation under actual conditions of operation.

Still another object of my invention is to provide a circuit arrangement for an insulation testing apparatus in which the dielectric properties of insulation may be readily determined by readings given by a meter or meters where reference is necessary to a calibration chart for directly determining the quality of insulation of the insulator under observation.

A further object of my invention is to provide an insulation testing apparatus including a circuit arrangement for measuring the phase angle between two alternating electric currents which are caused to flow upon the impression of a source of voltage applied to the two circuits through which the currents flow whereby the absolute power factor of the charging current in a path which may contain insulation material under test may be measured for correspondingly determining the properties of insulation of the material under test.

A still further object of my invention is to provide a circuit arrangement for measuring the dielectric properties of insulation in which two electric alternating currents are caused to flow from a common source of alternating current in separate paths, one of which contains a specimen of insulation under test and the other of which contains a standard capacity of known value and in which, both currents may be of small magnitude for readily enabling the power factor of the charging current to the insulation to be determined for correspondingly determining the insulation properties of the insulation material.

Another object of my invention is to provide a circuit arrangement for insulation testing apparatus by which measurements can be conveniently made at very high voltages thus permitting the use of existing connections to operating systems for the purpose of energizing the insulation for test in its normal operating position and at its normal operating voltage.

Still another object of my invention is to provide a circuit arrangement for an insulation testing apparatus wherein a pair of charging circuits, one of which contains a standard capacity of known value, and the other of which contains a specimen of insulation whose properties are to be determined, are simultaneously excited from a common source of alternating current, with means included in each of the charging circuits for determining the current therein and with means connected with the charging circuits for determining the phase angle difference between the currents for measuring the power factor of the charging current to the insulation under test for determining therefrom the dielectric properties of the insulation material.

Other and further objects of my invention reside in the construction and circuit arrangement of the insulation testing apparatus set forth more fully in the specification hereinafter following by reference to the accompanying drawings, in which:

Figure 1 is a schematic and diagrammatic circuit arrangement showing one form of insulation testing apparatus embodying my invention; Fig. 2 diagrammatically and schematically illustrates a modified form of insulation testing apparatus embodying my invention; Fig. 3 shows a set of cathode ray oscillograms of voltages existing in different parts of the circuit of the insulation testing apparatus of my invention; and Fig. 4 shows a further modified form of insulation testing apparatus embodying the principles of my invention.

My invention is directed to a circuit arrangement and apparatus arranged to measure the phase angle between two alternating electric currents flowing in separate paths due to the same source of voltage applied to the two paths through which the currents flow. Either or both of the currents may be of small magnitude which makes the device useful in determining the relative merit of insulations used in electric power systems by measuring the power factor of the charging current to the insulation. The measurement can conveniently be made at very high voltage which permits the use of existing connections to operating systems for the purpose of energizing insulation for test in its normal operating position and at its operating voltage.

Much of the radio interference is due to the poor insulation of bushings, and customary direct current tests for leakage are by no means satisfactory for finding out the quality of high potential insulators under actual conditions. The usual high frequency test is also too indirect to give an idea how high potential bushings do behave under actual line conditions.

Heretofore in the art, insulation testing apparatus has been of large size and has been very heavy. It has required in many cases, a special truck for the transportation of such apparatus for field tests. Such apparatus has been relatively expensive which has, to a large extent, restricted the general use of such equipment. Moreover, such apparatus has been limited in use to tests below approximately fifty kilovolts. The voltages on power systems in many places are often much higher than this and, in some instances, even higher than two hundred kilovolts. The apparatus of my invention is adaptable for testing insulation on high potential apparatus under actual conditions in the field. The apparatus is compact and light enough to be carried in a small case in the ordinary roadster. The whole device may be removed from the carrying case and suspended from the energized terminal of an apparatus bushing with the dials on the two meters (A. C. and D. C.) projecting downwards where the observer can take the readings either by eye or by a telescope if the distance from the meters should be too great.

Since the measurement employed in the apparatus of my invention is fundamentally one of phase angle difference between two currents, the absolute power factor of the charging current of an unknown is determined by measuring the phase displacement of this current from a current of known phase position.

The apparatus of my invention may take various forms, as will be described in detail as this specification progresses.

Fig. 1 shows an elementary metering circuit, in which unit 1 consisting of shunt resistor 1a, series resistor 1b and series condenser 1c represents the specimen of insulation under test. Reference character 2 represents a standard capacity and draws a current of known power factor with which the power factor of the current passing through the path which includes unit 1 is to be compared. Reference character 3 indicates the metallic housing or metallic lining of the casing which encloses the metering circuit and serves as an electrostatic shield for the circuit elements. In certain cases, the capacitance of this housing to ground also serves as the standard in place of the condenser 2.

Referring to the unit 1, representing the specimen of insulation under test, the condenser 1c represents that component of the specimen of insulation under test which is a perfect dielectric, resistor 1b is a series resistance representing the alternating current losses in a practical dielectric which is not perfect, and resistor 1a is a shunt resistor which represents the leakage over the surface of, or through, the specimen under test. Both resistance components 1a and 1b are detrimental qualities in the insulation, in other words, the resistance values of 1a and 1b would be infinite for perfect insulation. Older testing methods using direct current will detect and measure the leakage component 1a. However, the method of this invention involving measurement of power factor or watts loss with alternating current which may be at operating voltage and frequency, will detect and measure both the leakage component 1a and the loss component 1b. The relative magnitudes of the resistive components and the capacitive reactive component of the charging current of the insulating material determine the power factor of the charging current. The charging current of a perfect insulator would be entirely reactive having a power factor of zero. The current in a pure resistance, on the other hand, has a power factor of unity. Practical insulators have power factors between these values, mostly in the order of zero to twenty percent. The measuring device to which this invention relates is well adapted to measure power factors in this range.

The elementary measuring circuit, Fig. 1, is enclosed in metallic housing or shield 3 and consists of resistors 4 and 5, three element electron tube 6, direct current milliammeter 7, alternating current milliammeter 8, and cathode heating battery 9.

To understand the operation of the apparatus, consider the half of the alternating current cycle when current is entering the meter through wire 10 flowing through resistor 4 and then dividing, part going through milliammeter 8 and wire 11 to insulation under test 1, and another part of the current flowing through wire 13, resistor 5 to housing 3 and thence through connection 12 to standard condenser 2. Assuming for the time being that the specimen under test and the standard have the same power factor, then the voltage drop across resistor 4 will be such that the potential on wire 14 will be positive with respect to wire 13 at the same instant that the voltage drop across resistor 5 is such that the potential on wire 13 is positive with respect to housing 3. It will now be observed that the plate 15 of vacuum tube 6, connected through milliammeter 7 to wire 14 is at a positive potential with respect to cathode 16, which is connected by wire 19 to wire 13. Under this condition current could flow through wire 14, milliammeter 7, tube 6 by electron conduction from plate 15 to cathode 16 to wires 19 and 13, this being a parallel path with resistor 4 for the current entering through wire 10; if it were not for the fact that at this same instant, grid 17 is at a negative potential with respect to cathode 16 by virtue of the connection by wire 18 to housing 3 which is negative with respect to cathode 16. This is the condition existing when the currents to test specimen 1 and standard 2 are in phase and a minimum or zero reading is obtained on the milliammeter 7 due to the negative potential occurring on grid 17 at the same instant that positive potential exists on plate 15. The opposite half of the alternating current cycle, when current is flowing from specimen 1 and standard 2 toward line 10, need not be considered because tube 6 is not conducting when the plate potential is negative with respect to the cathode and, therefore, no current will flow through milliammeter 7 in the backward direction.

Now, consider the circuit of Fig. 1 for the condition of the power factor of the current to specimen 1 being lagging with respect to the current to standard 2. Under this condition, the current through resistor 5 reverses in direction prior (in time) to the reversal of current in resistor 4 so that for an interval of time, the voltage drop in resistor 5 will be such that grid 17 is positive with respect to cathode 16 while the voltage drop in resistor 4 still remains such that plate 15 is positive with respect to cathode 16. Therefore, during this interval of time, current will flow through wire 14, meter 7, from plate 15 to cathode 16 of tube 6, through wires 19 and 13 in parallel with resistor 4. This produces a deflection on the meter 7 which is a function of the phase displacement between the current to specimen 1 and standard 2 and the magnitude of the current to specimen 1 which is measured on meter 8. In practice, a calibration curve is made in the laboratory in which the ratio of the reading on meter 7 to the reading on meter 8 is plotted against the power factor of the charging current to specimen 1, after which it is only necessary to take the ratio of the meter readings and refer to the calibration to determine the power factor of the charging current to an unknown test specimen.

The heating of insulation in electrical systems is caused by the watts energy loss in the insulation. Having determined the power factor of the charging current to a specimen of insulation by means of the apparatus of my invention, the watts loss is easily computed for a known voltage and the current as read on meter 8 of Fig. 1.

In order to broaden the range of the apparatus of Fig. 1 to permit its use on specimens drawing charging currents of greatly different magnitudes and to increase the sensitivity of the apparatus for measuring power factors of very small currents and also to fit the meter range to power factor values between zero and twenty-five per cent such as usually encountered, a modified form of circuit may be employed as represented in Fig. 2.

Referring to Fig. 2, the specimen under test is depicted as an insulating bushing 20 used for the purpose of insulating the electrical conductor 21 from the metallic structure 22 which is connected to ground through wire 23. The apparatus of this invention is shown, enclosed in housing or shield 3, connected in series between the source of voltage entering at wire 10 and leaving the apparatus through wire 11 to supply the charging current to the insulation comprising the bushing 20, the circuit being completed through wire 23 which, in this case, connects to ground as the opposite side of the alternating voltage source, for the purpose of measuring the power factor and watts loss in the bushing insulation.

The standard condenser 24 of Fig. 2 is shown in broken lines since this may consist of the capacitance of housing 3 to ground if the voltage applied is high and the housing large enough and located close enough to ground so that the charging current drawn by the housing will produce sufficient voltage across glow tube 25 to bias the grid of electron tube 6 below the cut-off point for plate current. While the capacitance of the housing 3 to earth has been used, due to the limitations as to voltage and position of the device with reference to ground, more reliable results are obtained if 24 is a condenser of sufficient capacity to insure sufficient current to properly bias the grid of electron tube 6 under all circumstances. For this reason, for the purpose of this specification, condenser 24 will be considered a standard of known power factor and of sufficient capacitance so that the charging current drawn by it at the voltages and frequencies used will, at all times, be ample to practically mask any errors which might be introduced if this condenser were omitted.

In Fig. 2 will be recognized the fundamental circuit of Fig. 1 except that resistors 4 and 5 of Fig. 1 have been replaced by glow tubes 26 and 25 and the meter 7 of Fig. 1 has been replaced by a circuit connected with plate 15 through wire 14 and consisting of condenser 28 in parallel with resistance 27, the average voltage across which is measured by tube 29 and meter 30 which constitutes an electron tube voltmeter which will be more fully described hereinafter.

The glow tubes 26 and 25 of Fig. 2 are gaseous discharge tubes containing two elements or plates in an envelope containing a small quantity of inert gas. These tubes offer an infinite resistance (and a high capacitive reactance) in the circuit up to a definite voltage at which the gas breaks down and becomes conducting after which the voltage drop across the tube is maintained constant though the current through the tube may vary over a considerable range. In the use of the device of this invention, the applied voltage is high compared to the voltage at which the glow tubes regulate and, therefore, the voltage drops across these tubes are of practically square wave form and of constant magnitude. The impedance of the circuit composed of resistance 27 and capacitance 28 is made high enough so that in use, glow tube 26 is regulating the voltage even though it is shunted by the circuit through wire 14, resistor 27, electron tube 6, wire 19 and wire 13 during the intervals that electron tube 6 is conducting.

The operation of the circuit of Fig. 2 can be more readily explained by reference to cathode ray oscillograms of the voltages across various circuit elements as depicted in Fig. 3 for zero displacement and 30 degrees displacement between the currents to the specimen and to the standard. Oscillograms A and B of Fig. 3 show the wave form, magnitude and phase position of the voltage across glow tube 26 of Fig. 2. This voltage corresponds very nearly in phase position to the current flowing to the specimen 20 through meter 8 and wire 11. The current through wire 13 which goes through glow tube 25 and housing or shield 3 to standard 24 is so small in magnitude compared to the current to specimen 20 that it does not materially affect the phase angle of the current through glow tube 26 which actually carries the sum of the currents to the specimen and to the standard. Oscillograms C and D of Fig. 3 show the wave form, magnitude and phase position of the voltage across glow tube 25 of Fig. 2. This voltage corresponds in phase position to the current going to the standard 24. Voltages A and B are applied between cathode and plate of electron tube 6 while voltages C and D are applied to the same electron tube between the cathode and grid. Oscillograms E and F show the voltages across resistor 27 without condenser 28. Those oscillograms show the discrimination obtained with this device between the zero phase displacement condition in E, and the 30 degree displacement condition in F. Oscillograms G and H show the voltages across the parallel circuit of resistor 27 and capacitor 28 for the two conditions. The voltage in H is prolonged in time or electrical degrees over that in F which is an advantage in measuring it with the electron tube voltmeter which will be hereinafter described. The range of phase displacement over which the meter calibration is useful can be very conveniently changed by changing the resistance 27 and capacitance 28 which changes the size and shape of the voltage wave shown on oscillogram H. For a definite resistance 27 and capacitance 28, the average voltage across this circuit is a function of the phase displacement between the current to the specimen and the current to the standard, practically independent of the magnitude of the current to the specimen over quite a wide range due to the regulating action of the glow tubes.

The voltage across resistance 27 and condenser 28 is measured in the apparatus of Fig. 2 by an electron tube voltmeter consisting of three element electron tube 29, and milliammeter 30. The cathode 31 of electron tube 29 is heated by current from battery 32a. The voltage to be measured is applied between the cathode 31 and grid 32 of electron tube 29 through wires 35 and 34. The negative terminal of battery 42 is connected by wire 43 and 35 to cathode 31 while the positive terminal of battery 42 is connected by wire 41 through meter 30 and thence by wire 40 to plate 33 of electron tube 29. When no voltage exists across resistance 27, a maximum reading is obtained on meter 30 due to the current from battery 42 flowing through the meter and plate cathode circuit of electron tube 29. The current through the meter is reduced by an amount which is a function of the average voltage across resistance 27 since this circuit is so polarized that the grid 32 is made more negative with respect to the cathode 31 by the voltage across resistance 27.

It has been shown that the average voltage across resistor 27 of Fig. 2 is a function of the phase displacement between the currents to the specimen 20 and the standard 24 and that the reading of meter 30 is a function of the voltage across resistor 27. Therefore, the reading of meter 30 is a function of the phase displacement between the currents to specimen 20 and standard 24 and with a calibration curve expressing this function, the phase displacement between the charging current to the bushing 20 and the current to the standard 24 can be determined.

Fig. 4 is the circuit diagram of simpler arrangement of apparatus for measuring the phase displacement of the charging current to a specimen such as an insulator or bushing 20 and the charging current to a standard condenser 2. This apparatus has the advantage of simplicity but its sensitivity is less than that of the apparatus of Fig. 2 and, for this reason, a larger standard condenser is required for its use. However, in practice, it is not always necessary to measure the absolute value of power factor of charging current to a piece of apparatus, it only being necessary to compare the power factor of the charging current of one piece of equipment to that of another. For example, in a three-phase oil circuit breaker equipped with six bushings, it is rather unlikely that all the bushings will be bad and it is, therefore, possible to locate one or more defective bushings out of the six by simply comparing the phase angle of the charging current of each with the others. The apparatus illustrated in Fig. 4 is admirably suited to this purpose, one bushing being connected as shown at 20 and another being connectible in place of the standard condenser shown at 2.

Reference character 3, in Fig. 4, denotes a metallic housing which serves as an electrostatic shield for the apparatus, which consists of glow tubes 36 and 37 such as those previously described, and high resistance A. C. voltmeter 38. In operation, current enters the meter through wire 10 which is connected to metallic housing 3. The current then divides part flowing through wire 39 through glow tube 36 and wire 44 to specimen 20 and thence through wire 45 to the other side of the A. C. source. The other part of the current flows through wire 46, glow tube 37, wire 47 to standard 2 and thence through wire 48 to wire 45 and the other side of the A. C. source. If there is zero phase displacement between the currents through glow tubes 36 and 37 and these tubes regulate the voltage to the same value for the currents flowing, there will be no voltage across meter 38 which is connected by wire 49 to wire 44 and by wire 50 to wire 47. On the other hand, if there is phase displacement between the currents through glow tubes 36 and 37, the sum of the voltages across 36 and 37, will be applied to the meter for a portion of each half cycle during which the currents are flowing in opposite directions to specimen 20 and standard 2. Therefore, the average voltage read on voltmeter 38 is directly proportional to the degrees phase displacement between the currents to the specimen and the standard. The accuracy of this device is well within practical limits when the currents to specimen 20 and standard 2 are large compared to the current required by voltmeter 38 and when the applied voltage is high, compared to the voltage drop across the glow tubes. These conditions usually exist in practical applications of the apparatus of this invention to measurements of insulation power factors and apparatus such as bushings and apparatus windings encountered on electric power systems.

The circuit of Fig. 4 is advantageous when measuring phase displacement between currents of nearly the same magnitude since the current to the standard does not pass through the glow tube carrying the current to the specimen.

In the practical embodiments of the circuit of Fig. 2, the current to the standard can be very small, thereby permitting the use of a small light weight capacitor for the standard. Since this current is small compared to the current to the specimen when this circuit is used, the effect of the standard current flowing through the glow tube that carries the current to the specimen introduces but small error, which, as a matter of fact, is eliminated by calibration.

I have found the apparatus of my invention highly practical in its construction and operation and, while I have only described certain typically preferred forms of this invention, I do not wish to limit my invention to the specific details set forth herein, but reserve to myself any changes or variations that may appear to those skilled in the art such as use of electron tubes having more than one grid and I intend no limitations upon my invention other than are imposed by the scope of the appended claims.

What I claim as new and desire to secure by Letters Patent of the United States is as follows:

1. An apparatus for measuring the power factor of the charging current of and watts loss in insulating materials, comprising in combination with a source of alternating current of known voltage and frequency and supplying current to the insulating material under test, a capacitor of known capacity and power factor connected to receive current from said source, and means for comparing the power factor of the charging current of the insulating material with that of the known capacitor, said means consisting of impedances in series with paths containing the two aforementioned currents, a three-electrode electron tube, the voltage drops across the impedances being applied, one to the grid and cathode and the other to the plate and cathode of said electron tube, and a means for measuring the average plate current of said electron tube, said current being a function of the comparison of the power factor of the insulating material and that of the said capacitor.

2. An apparatus for measuring the power factor of the charging current of insulating materials, comprising in combination with a source of alternating current supplying current to the insulating material under test, a capacitor of known power factor connected to receive current from said source, and a means for comparing the power factor of the charging current of the insulating material with that of the capacitor, said means consisting of voltage regulating glow tubes in series with paths containing the two aforementioned currents, a three-electrode electron tube, the voltage drops across the glow tubes being applied one to the grid and cathode and the other to the plate and cathode of said electron tube, and means for measuring the average plate current of said electron tube, said current being a function of the comparison of the power factor of the insulating material and that of the said capacitor.

3. An apparatus for measuring the power factor of the charging current of insulating materials, comprising in combination with a source of alternating current supplying current to the insulating material under test, an air condenser, one capacity area of which is the housing of the apparatus itself with the other capacity area constituted by the ground, said condenser being connected to receive current from said source, and means for comparing the power factor of the charging current of the insulating material with that of the air condenser, said means consisting of voltage regulating glow tubes in series with paths containing the two aforementioned currents, a three-electrode electron tube, the voltage drops across the glow tubes being applied respectively to the plate and cathode and grid and cathode of said electron tube, and means for measuring the average plate current of said electron tube, said current being a function of the comparison of the power factor of the insulating material and that of the said condenser.

4. An apparatus for measuring the power factor of the charging current of insulating materials, comprising in combination with a source of alternating current supplying current to the insulating material under test, a capacitor of known power factor connected to receive current from said source, and a means for comparing the power factor of the charging current of the insulating material with that of the capacitor, said means consisting of voltage regulating glow tubes in series with paths containing the two aforementioned currents, a three-electrode electron tube, the voltage drops across the glow tubes being applied one to the grid and cathode and the other to the plate and cathode of said electron tube, an impedance in the plate circuit of said electron tube, and means for measuring the average voltage drop across said impedance, said voltage drop being a function of the comparison of the power factor of the charging current to the insulating material and that of the current to said capacitor.

5. An apparatus for measuring the power factor of the charging current of insulating materials, comprising a combination with a source of alternating current supplying current to the insulating material under test, a capacitor of known power factor connected to receive current from said source, and means for comparing the power factor of the charging current of the insulating material with that of the capacitor, said means consisting of voltage regulating glow tubes in series with paths containing the aforementioned currents, and an alternating current voltmeter connected to measure the average difference in voltage drops in the two glow tubes, said voltage being proportional to the phase displacement between the two currents, which displacement is in turn a function of the power factor of the charging current to the insulating material.

6. An apparatus for comparing the phase angle of the charging current of one sample of insulation with that of another sample comprising in combination with a source of alternating current, means for measuring the phase displacement between the charging currents to two specimens energized from said source, said means consisting of voltage regulating glow tubes in series with paths containing the aforementioned charging currents, and an alternating current voltmeter connected to measure the average difference in voltage drops across the two glow tubes, said difference in voltage drop being proportional to the phase displacement between the charging currents supplied to the two specimens.

7. In an apparatus of the class described, an electron tube having a grid, cathode and plate, a circuit connected between said grid and cathode, an independent circuit connected between said plate and cathode, an impedance device disposed in each of said circuits, a standard capacity unit having two terminals and one of said terminals connected with a point in said first mentioned circuit, a specimen of insulation material connectible between a point in said independent circuit and the other of said terminals on said standard capacity unit, an alternating current source connected across part of said independent circuit and said specimen of insulation material, and measuring means connected in circuit with said specimen of insulation material.

8. In an apparatus of the class described, an electron tube having a grid, cathode and plate, a circuit connected between said grid and cathode, an independent circuit connected between said plate and cathode, a glow tube disposed in each of said circuits, a standard capacity unit having two terminals and one of said terminals connected with a point in said first mentioned circuit, a specimen of insulation material connectible between a point in said independent circuit and the other of said terminals on said standard capacity unit, an alternating current source connected across part of said independent circuit and said specimen of insulation material, and measuring means connected in circuit with said specimen of insulation material.

9. In an apparatus of the class described, an electron tube having a grid, cathode and plate, a circuit connected between said grid and cathode, an independent circuit connected between said plate and cathode, an impedance device disposed in each of said circuits, a standard capacity unit connected with a point in said first mentioned circuit, a specimen of insulation material connectible with a point in said independent circuit, an alternating current source connected across part of said independent circuit and through said specimen of insulation material, a second impedance device disposed in series with said independent circuit, and measuring means connected in shunt with said second impedance device.

10. In an apparatus of the class described, an electron tube having a grid, cathode and plate, a circuit connected between said grid and cathode, an independent circuit connected between said plate and cathode, a glow tube disposed in each of said circuits, a standard capacity unit connected with a point in said first mentioned circuit, a specimen of insulation material connectible with a point in said independent circuit, an alternating current source connected across part of said independent circuit and through said specimen of insulation material, an impedance device connected in said independent circuit in series with the glow tube therein, and measuring means connected in shunt with said impedance device.

11. In an apparatus of the class described, an electron tube including a grid, cathode, and plate electrode, a circuit including an impedance device connected between said grid and cathode, an independent circuit including an impedance device connected between said plate and cathode, a connection from one side of said independent circuit to a specimen of insulation under test, a connection from the other side of said specimen of insulation under test and from the plate connection end of the impedance of said independent circuit to a source of alternating current, and a standard capacity having one side thereof connected between a point in the circuit extending between the grid and cathode and having the other side thereof connected to one side of the alternating current source.

12. In an apparatus of the class described, an electron tube including a grid, cathode, and plate electrode, a circuit including an impedance device connected between said grid and cathode, an independent circuit including an impedance device connected between said plate and cathode, a connection from one side of said independent circuit to a specimen of insulation under test, a connection from the other side of said specimen of insulation under test and from the plate connection end of the impedance of said independent circuit to a source of alternating current, a standard capacity having one side thereof connected between a point in the circuit extending between the grid and cathode and having the other side thereof connected to one side of the alternating current source, and measuring means connected in series with said independent circuit and in series with the connection between said independent circuit and the specimen of insulation material under test.

13. In an apparatus of the class described, an electron tube including a grid, cathode, and plate electrode, a circuit including an impedance device connected between said grid and cathode, an independent circuit including an impedance device connected between said plate and cathode, a connection from one side of said independent circuit to a specimen of insulation under test, a connection from the other side of said specimen of insulation under test and from the plate connection end of the impedance of said independent circuit to a source of alternating current, a standard capacity having one side thereof connected between a point in the circuit extending between the grid and cathode and having the other side thereof connected to one side of the alternating current source, and measuring means connected in series with said independent circuit and in series with the connection between said independent circuit and the specimen of insulation material under test, said measuring means comprising a direct current milliammeter connected in series in said independent circuit and an alternating current milliammeter disposed in the connection between said independent circuit and the specimen of insulation material under test.

14. In a testing apparatus, a source of alternating current, an electron tube circuit including a grid, a cathode and an anode, an impedance closing the circuit between said grid and cathode, an impedance disposed in the circuit between said cathode and anode, a specimen of insulation material under test, means for applying said source of alternating current through said specimen of insulation material under test across the impedance in the plate cathode circuit, a capacity connected between a point in the grid cathode circuit and the ground, a separate impedance in said plate cathode circuit, a measuring device connected across said separate impedance, and a measuring device disposed in the connection between the plate cathode circuit and the specimen of insulation material under test.

15. In a testing apparatus, a source of alternating current, an electron tube circuit including a grid, a cathode and an anode, an impedance closing the circuit between said grid and cathode, an impedance disposed in the circuit between said cathode and anode, a specimen of insulation material under test, means for applying said source of alternating current through said specimen of insulation material under test across the impedance in the plate cathode circuit, a capacity connected between a point in the grid cathode circuit and the ground, a separate impedance in said plate cathode circuit, an electron tube voltmeter connected across said separate impedance and an alternating current milliammeter disposed in the connection between said plate cathode circuit and the specimen of insulation material under test.

16. Testing apparatus comprising, in combination, with a source of alternating current, a glow tube, an input path extending through a specimen of insulation material to one side of said glow tube, a connection from the other side of said glow tube to the other side of the input path, a second glow tube having one side thereof connected to the side of the input path with which the first mentioned glow tube is connected, a standard capacity connected between the other side of said last mentioned glow tube and the other side of said input path, and means connected with the electrodes of said glow tubes remote from the electrodes thereof which connect with said input path for measuring the phase displacement of the current passing through said specimen of insulation material under test with respect to the phase displacement of the current passing through said standard capacity.

17. Testing apparatus comprising, in combination, with a source of alternating current, an impedance unit, an input path extending through a specimen of insulation material to one side of said impedance unit, a connection from the other side of said impedance unit to the other side of the input path, a second impedance unit having one side thereof connected to the side of the input path with which the first mentioned impedance unit is connected, a standard capacity connected between the other side of said last mentioned impedance unit and the other side of said input path, and means connected with the terminals of said impedance units remote from the terminals thereof which connect with said input path for measuring the phase displacement of the current passing through said specimen of insulation material under test with respect to the phase displacement of the current passing through said standard capacity.

18. The method of testing insulation material which comprises measuring both the leakage component and the loss component of current through the specimen of insulation under test, determining the power factor of said current, and comparing said power factor with a power factor of known magnitude by measuring the phase relation of currents having said power factors.

19. The method of testing insulation material by measuring the power factor of the charging current to the specimen of insulation under test, which comprises combining the charging current of unknown power factor with a charging current of known power factor, and measuring the phase displacement between said currents whereby the power factor of the current to the specimen of insulation under test may be determined.

FRED B. DOOLITTLE.